June 21, 1932.  N. G. MADGE  1,864,080
NONMETALLIC CONNECTION
Filed Dec. 10, 1927
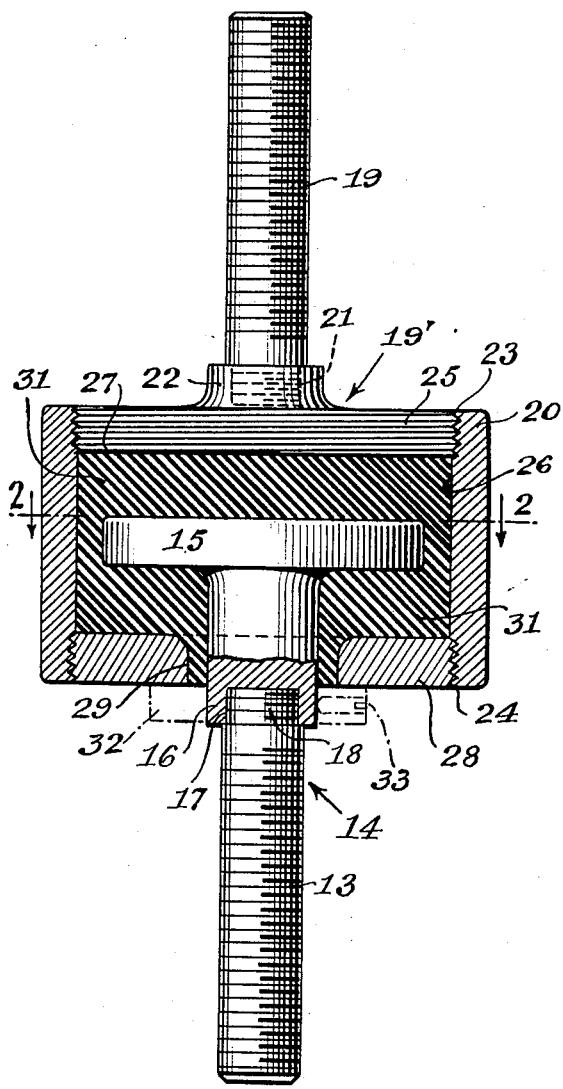
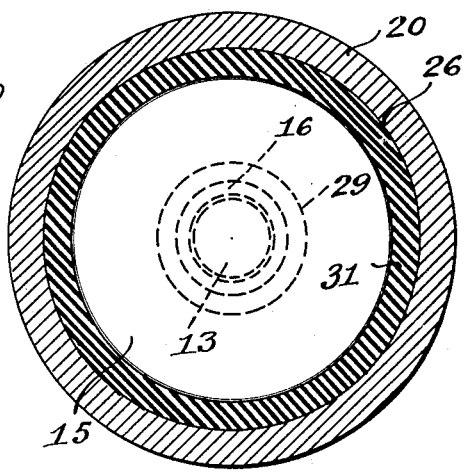
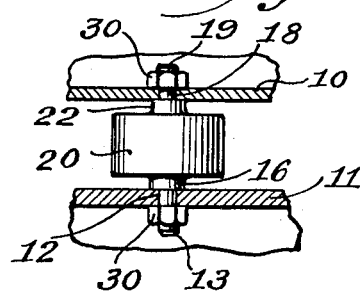
INVENTOR
Norman G. Madge
BY
  Ernest Hopkinson
ATTORNEY Patented June 21, 1932

1,864,080

UNITED STATES PATENT OFFICE

NORMAN G. MADGE, OF PROVIDENCE, RHODE ISLAND, ASSIGNOR TO THE MECHANICAL RUBBER COMPANY, OF CLEVELAND, OHIO, A CORPORATION OF NEW JERSEY

NONMETALLIC CONNECTION

Application filed December 10, 1927. Serial No. 239,236.

This invention relates to cushion connections or shackles for effecting a non-vibration transmitting mechanical connection between relatively movable parts.

The invention may have wide application in any situation where a shock-insulating and non-vibration transmitting connection is desired or for mounting various kind of equipment where a metal-to-metal contact is objectionable, but it will perhaps have greatest application as a motor mounting; that is, a connection and tremor insulator between the motor of an automobile and its supporting frame.

One of the objects of the invention is to provide an insulator or shackle preferably incorporating rubber as a medium for effecting a mechanical union between the motor and the frame, which will absorb or dampen vibration resulting from motor tremor or other causes, and also accommodate weaving of the frame with relation to the motor.

Another object is to provide a shackle of the foregoing character in which the rubber is entirely enclosed by the metal parts so that it will be protected from oil, which is generally present in large amounts around a motor. The shackle also incorporates novel features of construction, such that if the rubber should fail, the metal parts of the shackle will still hold the motor to the frame.

A further important feature is the provision of a shackle in which the metal parts form a vulcanizing mold, thus doing away with special molding equipment which has been indispensible heretofore. According to this feature, the parts are first assembled and then filled in with unvulcanized rubber of any consistency depending upon the particular use of the shackle. The whole assembly may be placed in an open heater to effect a cure of the enclosed rubber. As a result of this novel molding process, the relatively movable parts of the shackle are securely bonded together by the rubber so that the finished article presents a compact one piece structure, and is quickly applicable to its intended use. The insulator may also have wide application in the electrical field, either as a purely electrical insulator or as a combination device capable of preventing transmission of vibration between relatively movable parts while at the same time insulating them electrically from one another.

Other features and advantages will appear as the description proceeds.

In the accompanying drawing:

Fig. 1 is a vertical sectional view of one practical embodiment of my invention;

Fig. 2 is a transverse section on the line 2—2 of Fig. 1 in the direction of the arrows; and Fig. 3 is an elevation of the shackle and illustrating one of its uses.

Referring to the drawing, the reference character 10 may represent the base of a motor, and the reference character 11 a frame or support upon which the base 10 is to be secured in a manner to prevent the transmission of vibration or shock between the two parts.

For accomplishing this purpose, the frame 11 is provided with a vertical perforation 12 adapted to receive the threaded stud 13 of an element 14. The element 14 is provided with an enlarged portion or head 15 which may be either formed integrally with the stud 13 or may include a stem 16 bored out at 17 to receive the reduced and threaded portion 18 of the stud 13. The motor base 10 is also provided with a vertical perforation 18. for receiving the threaded stud 19 of an element 19' which also includes a rigid housing 20 forming a mold, disclosed in the present example of the invention as of circular form. The stud 19 may form an integral part of the housing 20, or may be connected thereto as illustrated, by reducing the stud 19 at 21 and threading the same into a bored extension 22 carried by the housing 20. In the illustrated example, the housing 20 is in the form of a ring or cylinder threaded adjacent both of its open ends, as indicated at 23 and 24, and the portion which carries the threaded extension 22 for the stud 19 may comprise a threaded closure 25 screwed into the threaded portion 23. However, this form of construction is not essential to the invention and any other way of providing the housing 20 with a stud 19 or fastener may be employed, or the parts comprising the stud 19, the closure 25 and the housing 20 may be all made in one piece.

Referring particularly to Fig. 1, it will be noted that the head 15 is disposed within the housing 20 in a manner to provide a space between the peripheral face of the head 15 and the inner walls 26 of the housing 20. It will be further noted upon inspection of Fig. 1, that the peripheral face of the head 15 presents a relatively broad surface close to and parallel with the adjacent interior wall 26 of the housing 20. The interposed rubber 31 is consequently narrow at this zone and therefore checks lateral shifting of the head 15 with respect to the housing 20. This effectively stabilizes the motor on the frame 11. There is also a space between the bottom surface 27 of the closure 25 and the upper face of the head 15. For enclosing the other end of the housing 20, there is provided a threaded disc 28 which is screw threaded into the portion 24 and has an enlarged perforation 29 through which the stem portion 16 of the head 15 projects to the exterior. The enlarged perforation 29 provides an annular clearance space all around the stem portion 16. The head 15 is also spaced from the disc 28. Nuts 30 fasten the threaded studs 13 and 19 to the support 11 and the motor base 10.

A non-metallic elastic material, such as rubber 31, is filled in to the spaces within the interior walls of the housing 20 so that it completely embeds the head 15 and the stem portion 16, and also fills in the annular space between the latter and the walls of the perforation 29 of the disc 28. The rubber filler thus provided in the perforation 29 coacts with the stem 16 to aid the broad peripheral face of the head 15 in effecting lateral stability. The rubber is introduced in unvulcanized form and may be of any suitable consistency or compound to conform to particular requirements. The whole assembly may then be subjected to a vulcanizing process, for instance, in an open heater whereby to vulcanize the rubber confined within the housing. For preventing the rubber from flowing out through the opening between the walls of the perforation 29 and the stem 16, there may be provided a temporary dam in the form of a collar 32 having a set screw 33 for fastening the collar to the stem 16 and against the outer face of the disc 28, as illustrated in dot-and-dash lines in Fig. 1, the collar 32 being removed upon completion of the vulcanizing process. It will thus be seen that the shackle forms its own mold and thereby dispenses with the need of all other forms of molding equipment. It will also be appreciated that the rubber provides an elastic mechanical connection between the studs 13 and 19 and insulates the same against the transmission of vibrations between the motor base 10 and the frame 11, and that the molding operation unites the metal parts and the rubber together to form a one piece entirety, thereby eliminating any possibility of looseness developing between the parts. This invention is therefore to be distinguished from former rubber mountings in which the rubber parts were molded separately and then assembled with the metal parts. The rubber also permits the stud 13 and the head 15 to partake of limited universal motion in relation to the stud 19, thereby accommodating any weaving of the frame 11 about the motor base 10. This also takes care of any inaccuracy in the manufacture of the assembly parts of the motor base 10 and the supporting frame 11.

It will be seen that during vertical vibration, the rubber confined between the closure 25 and the upper surface of the head 15 will be alternately compressed and expanded and this action will also occur on the opposite side of the head 15 with relation to the inner face of the disc 28 so that a checking and cushioning effect will be the result. The inner walls 26 of the housing 20 will also cooperate with the broad peripheral face of the head 15 to steady the vertical motion between the motor base 10 and the support 11 and thereby prevent sidewise or lateral motion between these parts.

While the invention has been described in connection with its preferred use as a tremor stop for motors, it will be apparent that it is suitable for use between any two relatively movable parts where it is desired to insulate them against shock or vibration, and, that due to the fact that the metallic parts are insulated from one another by a non-conducting material, the shackle is well adapted for use as an electrical insulator or as a combination electrical insulator and shock insulator or tremor stop.

Having thus described my invention, what I claim and desire to protect by Letters Patent is:

1. A combined insulating and vibration-dampening device for connecting relatively movable parts, comprising a housing adapted to be secured to one of the parts, a member attached to another part and including a headed portion disposed within the housing, and vibration-dampening insulating material filling said housing and embedding said headed portion, the latter having a broad peripheral face disposed relatively close to and parallel with the opposite peripheral wall of said housing and adapted to prevent lateral shifting of said headed portion with respect to said housing.

2. A combined insulating and vibration-dampening device for connecting relatively movable parts, comprising a housing adapted to be secured to one of the movable parts, the upper and lower walls of said housing being substantially flat and disposed in parallel planes, a member attached to the other movable part, and having a portion extending into the housing through an aperture in one of said walls, and terminating in a T-shaped head, the top and bottom surfaces of which are in planes parallel to said upper and lower walls, said aperture being larger than the portion of the member passing therethrough, and non-metallic yielding material completely filling said housing and the space between said member and said aperture, said material comprising rubber composition vulcanized with the housing and member in assembled relation, said material being thicker between the top and bottom of said head and said upper and lower walls respectively than between the sides of said head and the adjacent side of the housing, said head being arranged to overextend said lower wall of the housing in all directions around said aperture.

3. A yieldable connection comprising a rigid housing in the form of a mold, a member including a substantially flat head having a peripheral face disposed closely adjacent to an inner peripheral wall of the housing, and rubber composition cured in said housing to unite the same and the substantially flat head together, whereby said housing, the head and the rubber form a united whole.

4. A yieldable connection comprising a closed rigid housing forming a mold, said housing carrying means adapted for attachment to a motor base, a vulcanizable material filling said housing, and rigid means for connecting the said filling material to a motor frame, said rigid means including a headed portion embedded in said filling material and another portion extending through an opening in said housing, said headed portion having a peripheral face disposed closely adjacent to an inner peripheral wall of the said housing, said filling material being cured in situ to the said housing and rigid means.

Signed at Providence, county of Providence, State of Rhode Island, this 5th day of December, 1927.

NORMAN G. MADGE.